United States Patent Office 3,051,741
Patented Aug. 28, 1962

3,051,741
PROCESS FOR PURIFYING ALKYLATED ACID AMIDES
Herbert Marzolph and Walter Ruf, Dormagen, and Herbert Corte, Opladen, Germany, assignors to Farbenfabriken Bayer Aktiengesellschaft, Leverkusen, Germany, a corporation of Germany
No Drawing. Filed Dec. 6, 1960, Ser. No. 73,974
Claims priority, application Germany Dec. 19, 1959
7 Claims. (Cl. 260—465.4)

The present invention relates to a specific process for purifying alkylated acid amides which have become contaminated during the dry-spinning or wet spinning process. Decomposition of the solvent always occurs when spinning solutions of high-polymer substances, such as acrylonitrile polymers, in alkylated acid amides, such as dimethyl formamide. The chief decomposition products are amines and acids. When recovering the solvents, these amines and acids must be completely removed before the solvents are used again, because they discolor the spinning solutions and thereby make them unserviceable for the manufacture of white filaments or threads.

In many processes the solvents, which are conducted in circulation, are purified as thoroughly as possible in each recovery process. Simple distillation of the solvents does not, however, yield sufficiently pure products and consequently it is necessary to employ more complicated processes which generally have to be carried out in several stages.

It is already known that the solvents to be purified can be fractionally distilled with the addition of entraining agents, such as benzene or aliphatic alcohols. Another procedure is to separate out the amines contained in the solvent by distillation with water, whereupon any formic acid remaining in the solvent is thereafter catalytically decomposed in the vapor phase.

The single-stage purification processes do not achieve the desired object and the multiple stage processes cannot completely free the cyclically conducted solvents from impurities. It has been found that the aforementioned processes do not satisfy industrial requirements, especially when the solvents have been used for a relatively long time.

Processes for the purification of alkyl formamides which have become contaminated during spinning processes are also known in which ion exchangers are employed.

In the process described in German patent specification No. 1,015,423, the purification is carried out by treating the undiluted solvents with substances having an adsorbing action and, if necessary, by passing inert gases or vapors through the solvent.

In one example, there is described the use of a strongly acid ion exchanger for the purification of dimethyl formamide. The slightly yellowish filtrate which is obtained must thereafter be distilled in vacuo to remove other impurities. However, this process also does not result in a completely clean dimethyl formamide.

According to the data given in J. Pollym. Sci. 32 (1958), pages 323 to 341, and more especially page 325, dimethyl formamide can be completely deionised if it is treated with a mixed bed of strongly acid and strongly basic ion exchangers. Another known process uses strongly acid and weakly basic ion exchangers (see Belgian patent specification No. 576,060). These processes are restricted to the use of practically anhydrous dimethyl formamide.

The aforementioned three processes for purifying alkyl formamides, using ion exchangers, have numerous disadvantages which make them difficult to carry out, particularly on an industrial scale. So far, no strongly basic or strongly acid ion exchanger is known which is absolutely resistant to the extraordinary dissolving power of dimethyl formamide. This means that the ion exchangers, after being used for a relatively long period, lose increasingly more active substance when subjected to these processes. Moreover, the dimethyl formamide which is to be purified is also contaminated. This latter process is based on the fact that with the alternate charging of the ion exchangers with anhydrous dimethyl formamide and aqueous regeneration liquids, strong changes in the volume of the exchangers occur due to swelling processes. An additional disadvantage in practice is that after the regeneration of the ion exchangers with aqueous regeneration liquids, the water taken up by the exchangers must be completely displaced by inert solvents before the exchangers come into contact with the alkyl formamide which is to be purified. If the removal of the water is omitted, the ion exchangers (especially strongly basic ion exchangers) decompose the alkyl formamide which is to be purified. The capacity of the exchanger is greatly reduced by the adsorption of some of the cleavage products and the alkyl formamide is contaminated by the other decomposition products.

The aforementioned three purification processes using ion exchangers cannot be used with advantage on an industrial scale, since either they do not result in products having a sufficiently high degree of purity or the alkyl formamide to be purified must be completely freed from water, which cannot be completely achieved on an industrial scale with the solvents employed in the spinning processes, otherwise the ion exchangers are too quickly exhausted.

It is an object of the present invention to provide a process for the purification of alkylated acid amides which have become contaminated during use in wet-spinning or dry-spinning processes. An additional object is to ensure that these alkylated acid amides are so well purified that they can be conducted in circulation with practically no limitation in the dry-spinning and wet-spinning processes. Yet another object is to free these solvents from ionic and non-ionic impurities. Yet another object is to provide a new process which can be carried out industrially in a simple manner, it being possible to purify directly those aqueous mixtures of these solvents which are formed during the spinning process. Other objects will be apparent from the following description and examples.

It has now been found that acid amides which are alkylated on the nitrogen atom and which have become contaminated during use as solvents in spinning processes, can be completely purified while avoiding the aforementioned disadvantages if the alkylated acid amides, in admixture with at least 10% by weight and preferably from 30 to 35% by weight of water, are first of all conducted over a strongly acid ion exchanger in the H-ion form, then over a strongly basic ion exchanger in the carbonate ion form or over a mixture of both exchangers, and finally the alkylated acid amides are freed from water by fractional distillation. For economic reasons the water content should not be below 10% and not above 60%.

The present invention is based, inter alia, on the knowledge that when spinning solutions of high-polymer substances in alkylated acid amides, the amides are decomposed in such a way that not only ionic but also non-ionic cleavage products are formed. Thus, not only dimethylamine, monomethylamine and formic acid are formed for example from dimethyl formamide during dry spinning but formaldehyde, carbon dioxide and carbon monoxide may also be formed depending, inter alia, on the air humidity and the spinning temperature. These decomposition products thereafter react with one another in known manner, so that for example alkylated ammonium formates are formed and various condensation products of formaldehyde and amines. It has now been recognized that these condensation products cannot be, or cannot be completely, separated out of the contaminated alkylated acid amides by distillation. Like the amines themselves, these impurities discolor the spinning solutions. Special condensation products of this type are in practice scarcely dissociated in water. They are consequently only insufficiently absorbed or are not absorbed at all by the ion exchangers.

Strongly acid ion exchangers are very effective in these purifying operations. They liberate strong acids in the liquids to be purified which in the presence of sufficient quantities of water cause a rapid hydrolysis of the aldehydeamine compounds. Consequently, the presence of a sufficient quantity of water is essential. The amines thus liberated are immediately absorbed by the strongly acid ion exchangers. The aldehydes remain in the solvent-water mixtures and can later be separated out by distillation. Should the alkylated acid amides initially purified by treatment with acid ion exchangers be conveyed to strongly basic ion exchangers in the OH ion form, the alkylated acid amides would decompose because of the water which is present. As a result, there would be rapid exhaustion of the basic ion exchanger due to the adsorption of the acid cleavage products. In addition, the amines which are liberated would contaminate the alkylated acid amides which are to be purified and would produce condensation products with the remaining aldehydes. However, the cleavage of the alkylated acid amides and the reformation of condensation products can be avoided if the basic ion exchangers are used in the carbonate ion form instead of in the OH ion form. The same favorable results cannot be produced with weakly basic ion exchangers in the OH ion form.

The process according to the present invention has considerable advantages over the prior known processes. In the first place, the aqueous solvent mixtures formed during the spinning processes can be directly subjected to the purification, since complete dehydration thereof is not necessary. Moreover, completely pure alkylated acid amides are obtained. On account of the water content, the amines and acids which make up the major part of the impurities are present in the ion form. The ion exchangers are in a water-swelled condition. As a result the acid amides to be purified can be conducted over the ion exchangers with a very high specific loading which is especially advantageous from the point of view of yield per unit of volume and time. The ion exchangers always remain in a water-containing medium. They do not come into contact with anhydrous or practically anhydrous alkylated acid amides and thus are never exposed to their intense dissolving power. No ion exchanger substance is dissolved out. The differences in volume due to differential swelling of the ion exchanger on being charged with aqueous alkylated acid amides and aqueous regeneration liquids remain small. A dehydration of the freshly regenerated ion exchanger with inert solvents is not necessary.

The alkylated acid amides purified by the process according to the present invention are completely deionised, do not contain any condensation products of amines and aldehydes and can, with equal success, be used as suitable solvents in a fresh condition for the production of colorless spinning solutions.

In accordance with the process of the invention, it is possible to purify all alkylated acid amides which have become contaminated by being used as solvents in dry spinning processes or wet spinning processes or also by being used as plasticisers in the so-called melt spinning process with a small quantity of solvent. The solvents most generally used for these spinning processes are amides of low aliphatic acids which are substituted on the nitrogen atom by lower alkyl groups. Specific examples of these are N,N-dimethyl formamide, N,N-dimethyl acetamide, N,N-dimethyl methoxy acetamide and N-methyl-N-$\beta$-cyanoethyl formamide.

Any strongly acid ion exchanger can be used as the acid ion exchanger, for example the sulphonation products of cross-linked polystyrenes. The H-ion form of these exchangers is produced in known manner.

As basic ion exchangers there may be employed all exchangers having strongly basic groups, such as the quaternary ammonium compounds of cross-linked polystyrenes obtained by aminomethylation and subsequent quaternisation. The carbonate ion form of these exchangers is produced in the usual way.

The fractional distillation necessary to separate out the water can be carried out in any desired manner. In order to avoid any decomposition, it is preferred to work in vacuo. The process of the invention can for example be very successfully used for purifying dimethyl formamide which has been used in the dry spinning of acrylonitrile polymers and which has become contaminated thereby. Even when the dry spinning is carried out with a relatively high wall temperature of the spinning chute and the dimethyl formamide has been circulating for a long time, a crystal clear neutral solvent is always obtained by means of the process according to the present invention, with which solvent it is possible to produce the usual practically colorless spinning solutions.

In order that the invention may be more clearly understood the following examples are given by way of illustration only:

*Example 1*

Two columns are filled with ion exchanger resins. The first column contains 100 cc. of a sulphonated polystyrenet cross-linked with 8% of divinyl benzene and in the H-ion form. The second column contains 200 cc. of a strongly basic exchanger in the carbonate ion form, this exchanger having been obtained by aminomethylation of polystyrene cross-linked with 5% divinyl benzene and subsequent quaternisation with methyl chloride. The columns are connected in series and charged with a "crude dimethyl formamide mixture," such as that obtained in the recovery of the dimethyl formamide after spinning a polyacrylonitrile solution by means of a dry spinning process and collection of the stretching and washing waters which are formed. The said mixture consists of 65.4% by weight of dimethyl formamide and 34.6% by weight of water. It is brownish in color and contains 8.3 milliequivalents of bases and 6.5 milliequivalents of acids per kg. of dimethyl formamide. Its specific electrical conductivity is $192.10^{-6}$ ohm$^{-1}$ cm.$^{-1}$. The specific loading (measured in volume of liquid per volume of ion exchanger resin per hour) of the ion exchanger resins is 100 in the case of the cation exchanger and 50 in the case of the anion exchanger. The filtrate which discharges has an electrical conductivity of $1.35.10^{-6}$ ohm$^{-1}$ cm.$^{-1}$. About 22 litres of "crude mixture" can be conducted through the columns filled with ion exchanger resins before the electrical conductivity of the filtrate shows an appreciable increase, thereby indicating an increasing exhaustion of the resins. After separating out the water at reduced pressure by means of a fractionating column, a colorless dimethyl formamide is obtained which has an electrical conductivity of $0.5 .10^{-6}$ ohm$^{-1}$ cm.$^{-1}$ and which does not contain any detectable quantities of basic or acid impurities. A 25% spinning solution of polyacrylonitrile in this dimethyl formamide, prepared by heating, is slightly light yellowish in color. If the crude mixture is carefully distilled by fractionation without previous purification by ion exchangers, a dimethyl formamide is obtained which gives polyacrylonitrile solutions which are dark brown in color.

*Example 2*

The columns with the ion exchanger resins are arranged as in Example 1. They are charged with a mixture of dimethyl acetamide and water, such as that obtained by spinning a 24% solution of polyacrylonitrile in dimethyl acetamide by a wet spinning process and collecting the precipitation and washing liquids. It has a composition of 55.2% dimethyl acetamide and 44.8% water. As regards decomposition products, it contains 4.5 milliequivalents of acetic acid and 4.5 milliequivalents of dimethylamine per kg. of dimethyl acetamide, a small unknown quantity of polyacrylonitrile of low molecular weight, and also alkali metal sulphates formed from the salts required for the polymerization and which could not be completely washed out during the working up of the polymer. It has a specific electrical conductivity of $115.10^{-6}$ ohm$^{-1}$ cm.$^{-1}$. The specific loading of the ion exchanger resins is 140 in the case of the cation exchanger and 70 in the case of the anion exchanger. After about 35 litres of liquid have run over the ion exchanger, the electrical conductivity of the filtrate rises to values above $2.10^{-6}$ ohm$^{-1}$ cm.$^{-1}$. The filtrate is fractionally distilled in vacuo and yields a crystal clear solvent which contains no detectable quantities of amine or acid and from which practically colorless spinning solutions can be prepared. If the same dimethyl acetamide-water mixture is distilled without having previously been passed over the ion exchanger resins, a distillate is obtained which contains both amine and acid. Spinning solutions prepared therefrom with the use of polyacrylonitrile are discolored a yellowish-brown color.

*Example 3*

The "crude dimethyl formamide mixture" employed in Example 1 is conducted over ion exchanger resins identical with those employed in Example 1 with the exception that only one column is used as a so-called mixed bed, in which the ion exchanger resins are present in intimately mixed form. The procedure is in other respects the same as in Example 1. Both the filtrate obtained and the distillate prepared therefrom are completely equivalent to the products obtained according to Example 1.

We claim:

1. In a process for the purification of an alkylated acid amide selected from the group consisting of N,N-dimethyl formamide, N,N-dimethyl acetamide, N,N-dimethyl methoxy acetamide and N-methyl-N-β-cyanoethyl formaamide, the improvement which comprises passing said alkylated acid amide containing at least about 10% by weight of water over a strongly acid ion exchanger in the H-ion form, and over a strongly basic ion exchanger in the carbonate ion form, and thereafter removing a substantial amount of the water from said amide to obtain the purified product.

2. Process of claim 1 wherein the water is removed from the amide by fractional distillation.

3. A process according to claim 1 wherein the contaminated alkylated acid amide is combined with at least about 10% by weight of water and conducted over a mixture of strongly acid ion exchangers in the H-ion form and strongly basic ion exchangers in the carbonate ion form.

4. A process according to claim 1 wherein N,N-dimethyl formamide is combined with about 10%–60% by weight of water.

5. A process according to claim 1 wherein N,N-dimethyl acetamide is combined with about 10%–60% by weight of water.

6. A process according to claim 1 wherein N,N-dimethyl methoxy acetamide is combined with about 10%–60% by weight of water.

7. A process according to claim 1 wherein N-methyl-N-β-cyanoethyl formamide is combined with about 10%–60% by weight of water.

References Cited in the file of this patent

UNITED STATES PATENTS 2,942,027    Hewett et al. _____ June 21, 1960